April 10, 1945. C. C. WHITE 2,373,281
STORAGE BATTERY PLATE
Filed Dec. 26, 1941
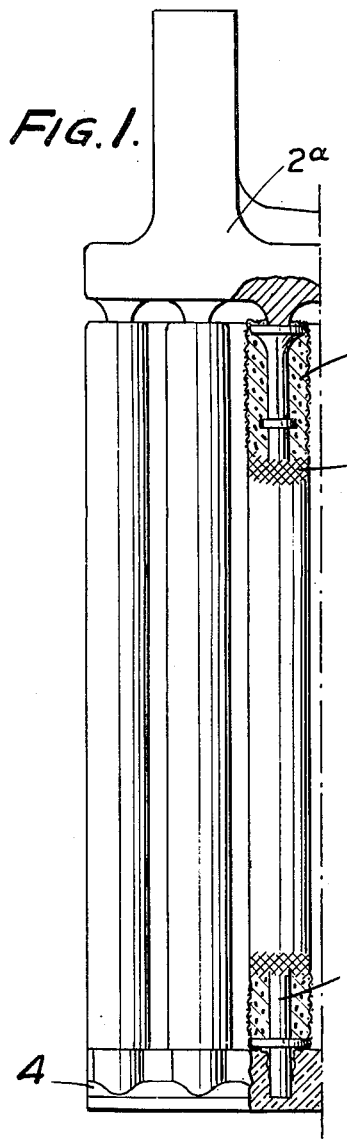
FIG.1.
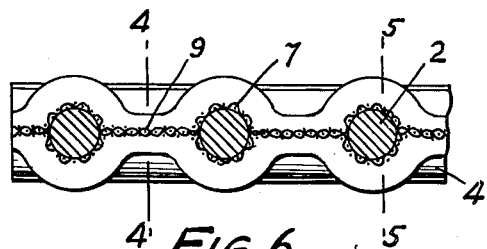
FIG.6.
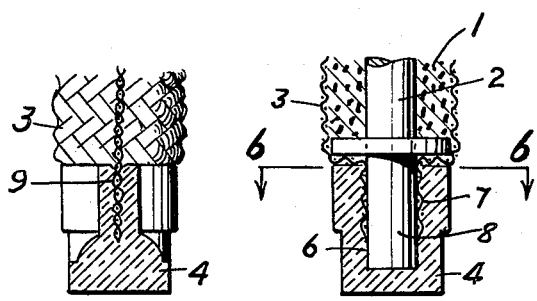
FIG.4. FIG.5.
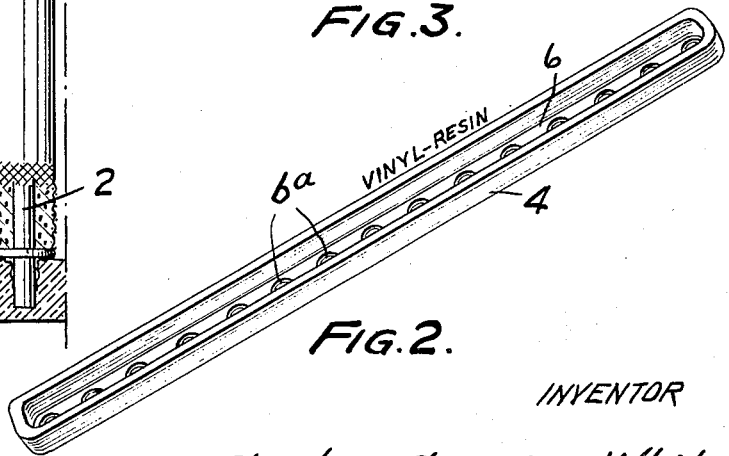
FIG.3.
FIG.2.
INVENTOR
Curtice Chandler White
BY
Augustus B. Snoughton
ATTORNEY.
WITNESS:

Patented Apr. 10, 1945

2,373,281

UNITED STATES PATENT OFFICE 2,373,281

STORAGE BATTERY PLATE

Curtice Chandler White, Johnsville, Pa., assignor to The Electric Storage Battery Company, Philadelphia, Pa., a corporation of New Jersey Application December 26, 1941, Serial No. 424,510

7 Claims. (Cl. 136—55)

This invention relates to storage battery plates or electrodes and more particularly to storage battery plates or electrodes of the type having a plurality of pencils of active material mounted on electrically conducting spines which are arranged in a row between top and bottom bars, the pencils of active material being covered by a fabric retainer which prevents shedding of the active material and maintains the material in proper contact with the spines. It is an object of this invention to provide an improved plate or electrode of this type.

More particularly, this invention relates to the bottom bar for a plate of the above-mentioned type and has as its object the provision of a new and improved bottom bar of insulating material which is inexpensive to manufacture and easy to assemble.

More specific objects of this invention are:

1. To provide an improved bottom bar which can be readily secured to the lower end of the spines and to the fabric retainer so as to prevent the active material, or detached particles thereof, from escaping into the electrolyte at this point.

2. To provide an improved bottom bar of insulating material which can be readily molded, or otherwise made, and which can be easily applied to the ends of the spines and the adjacent ends of the retainer or retainers.

3. To provide an improved bottom bar of thermoplastic material for positioning and holding the lower ends of the spines in proper spaced relation.

4. To provide an improved bottom bar which opposes an accumulation of particles of active material at the top surface of the bottom bar should such particles escape through the fabric retainer.

5. To provide an improved thermoplastic bottom bar which may be readily applied to a plate by a simple heating and pressing operation which insures a firm connection between the bottom bar and the spines and retainer.

Further objects and advantages of this invention will appear as the following description proceeds and the features of novelty which characterize this invention will be set forth in the claims appended to and forming part of this specification.

For more complete understanding of this invention reference should be had to the accompanying drawing in which:

Fig. 1 is a side view, with parts broken away, of a storage battery plate embodying features of the invention;

Fig. 2 is a perspective view of the bottom bar before assembly;

Fig. 3 is a transverse sectional view, drawn to an enlarged scale, of the bar shown in Fig. 2 and indicating by dotted lines a portion of a spine and of the retainer;

Fig. 4 is a transverse sectional view taken on the line 4—4 of Fig. 6;

Fig. 5 is a similar view taken generally on the line 5—5 of Fig. 6; and

Fig. 6 is a sectional view taken on the line 6—6 of Fig. 5.

Referring to the drawing and more particularly to Fig. 1, it will be observed that the improved battery plate or electrode of this invention comprises a plurality of pencils each consisting of active material 1 mounted on a spine 2. As shown, these pencils are arranged in a row and are spaced from each other, the top of each spine being secured to a metallic top bar 2a. Provided on the pencils is a fabric retainer or porous cover 3 which may be made of various materials, such as glass or vinyl resin, and may be in the form of an individual tube for each pencil or in the form of a number of connected tubes as shown in Fig. 1. The top of this fabric retainer will be secured to the upper end of the spines and the top bar by suitable securing means (not shown).

Arranged to maintain the lower end of the spines in their proper spaced relation is a bottom bar 4. In accordance with this invention, this bottom bar is made from a moldable thermoplastic material. Referring to Figs. 2 and 3, it will be observed that the bottom bar 4 consists of a substantially trough-shaped member having outwardly inclined side walls 5 and a bottom wall 6 which is provided with a plurality of spaced circular recesses or pits 6a. In the preferred form of this invention, the bottom bar 4 will be molded to the shape shown in Figs. 2 and 3 from a thermoplastic resin of the vinyl group and preferably from "Polystyrene."

As shown in Fig. 3, the lower ends 7 of the fabric retainer 3 projects down below the end of the active material 1 and the outwardly inclined side walls 5 of the bottom bar serve to guide the ends 7 of the fabric into the main recess or trough of the bar. The circular recesses 6a on the other hand are adapted to receive the lowermost ends 8 of the spines 2, thereby properly spacing and maintaining the spines in position.

In assembling the improved bottom bar of this invention on the plate, the preferred bar 4 is inserted over the ends of the spines so that the portions 8 of the spines project into their respective pits or recesses 6a. When this has taken place, the relation between the bottom bar, the spines and the fabric retainer will be as is indicated in Fig. 3. Then, by means of a suitable jig, heat and pressure is applied to the outwardly inclined side walls of the bottom bar to cause them to be pressed inwardly and molded to engage the fabric and the lower portions of the spines, as shown in Figs. 4 through 6. It is observed from these figures that the portion of the bottom bar lying between the spines is pressed inwardly an amount sufficient to secure the intermediate portion 9 of the retainer between the opposite walls thereof, whereas the side walls adjacent the spines secure the remaining portion of the fabric retainer against the lower end of the spines. In the molding operation, the recesses or pits 6a will be deformed so as to firmly engage the lowermost portions 8 of the spines.

As shown in Figs. 4 through 6, the upper portion of the bottom bar when finally secured in position will assume a substantially corrugated shape. It is to be understood, however, that this invention is not limited to this particular shape for the original shape of the bottom bar could be such that, after the molding operation, the outer surface of the walls of the bottom bar would be uncorrugated or smooth. It is pointed out, however, that the construction shown is preferred for it offers the minimum surface for the accumulation of particles of active material which may escape through the fabric retainer.

While a particular embodiment of this invention has been set forth, it will be understood that it is not intended to be limited thereto, since many modifications may be made and it is contemplated by the appended claims to cover all such modifications as may come within the true spirit and scope of this invention.

I claim:

1. In a storage battery plate having a row of pencils of active material mounted on spines and covered by flexible fabric retainers, said spines and retainers extending beyond the lower ends of the pencils of active material, a bottom bar for maintaining said spines in alignment and for securing the projecting ends of said retainers comprising a longitudinal member of thermoplastic synthetic resin material molded on the lower ends of said spines and confining the projecting ends of said retainers beneath the lower ends of the pencils of active material and against the projecting ends of the spines.

2. In a storage battery plate having a row of pencils of active material mounted on spines and covered by fabric retainers, said spines and retainers extending beyond the lower ends of the pencils of active material, a vinyl resin bottom bar having recesses into which the ends of said spines project and side walls projecting above the lower ends of said retainers but terminating below the lower ends of said pencils of active material, said side walls being deformed to secure said spines in said recesses and the adjacent portions of said retainers against the lower portions of said spines.

3. An article of manufacture adapted for use as a bottom bar for a storage battery plate of the type having a row of pencils of active material supported on spines, comprising a prefabricated elongated trough-shaped bar of thermoplastic synthetic resin material having outwardly inclined side walls, and a bottom wall, said bottom wall provided with counter sunk spaced recesses adapted to receive the ends of the spines, said side walls deformable toward each other and between said recesses.

4. A bottom bar for a storage battery plate of the type having a row of pencils of active material supported on spines and enclosed in a fabric retainer, said spines and retainer extending below said active material, comprising a prefabricated body of thermoplastic synthetic resin material having a bottom wall provided with spaced recesses adapted to receive the ends of said spines and upstanding side walls adapted to be deformed by heat and pressure to engage and secure the adjacent end of said fabric retainer.

5. In a storage battery plate having a row of pencils of active material mounted on spines secured to a top bar and having a fabric retainer enveloping said pencils of active material, a bottom bar of thermoplastic synthetic resin material having a bottom wall provided with recesses to receive the ends of said spines and side walls projecting above said bottom wall to receive therebetween the adjacent end of said fabric retainer, said side walls being deformed inwardly to secure to said spines the portions of said retainer which surround and contact the ends of said spines.

6. In the manufacture of storage battery plates of the type recited, the improvement which consists in mounting pencils of active material and their spines and retainers on a top bar with the spines and retainers projecting beyond the active material, preforming a trough-shaped bar having recesses in its bottom wall, arranging the end portions of the retainers in the cavity of the trough-shaped bar and the ends of the spines in the recess, and securing the parts in the described positions by deforming the side walls of the bar by the application of heat and pressure.

7. In the manufacture of storage battery plates of the type recited, the improvement which consists in mounting pencils of active material and their spines and retainers of flexible fabric on a top bar with the spines and retainers projecting beyond the active material, preforming a trough-shaped bar having recesses in its bottom wall, arranging the end portions of the flexible retainers in the cavity of the trough-shaped bar and the ends of the spines in the recesses and securing the parts in the described positions with the ends of the flexible retainers brought under the ends of the pencils of active material and against the ends of the spines by deforming the side walls of the bar by the application of heat and pressure.

CURTICE CHANDLER WHITE.